(12) United States Patent
Sadano et al.

(10) Patent No.: US 6,463,369 B2
(45) Date of Patent: Oct. 8, 2002

(54) LANE FOLLOWING VEHICLE CONTROL AND PROCESS

(75) Inventors: On Sadano; Hiroshi Kawazoe; Masayasu Shimakage, all of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/875,157

(22) Filed: Jun. 7, 2001

(65) Prior Publication Data

US 2002/0007236 A1 Jan. 17, 2002

(30) Foreign Application Priority Data

Jul. 7, 2000 (JP) .......................... 2000-207179

(51) Int. Cl.[7] .......................... G01C 21/00; G01S 13/00
(52) U.S. Cl. .......................... 701/28; 701/41; 701/96; 342/70; 342/66; 340/435; 340/436; 180/167; 180/168; 180/169; 348/118; 348/119

(58) Field of Search .......................... 701/28, 41, 23, 701/301, 96; 180/167, 168, 169; 348/118, 119; 342/70, 66; 340/435, 436

(56) References Cited

U.S. PATENT DOCUMENTS 5,765,116 A * 6/1998 Wilson-Jones et al. ....... 701/41
6,185,492 B1 * 2/2001 Kagawa et al. ................ 701/41

FOREIGN PATENT DOCUMENTS

JP  7-104850  4/1995
JP  11-102499  4/1999

* cited by examiner

Primary Examiner—Yonel Beaulieu
(74) Attorney, Agent, or Firm—Foley & Lardner

(57) ABSTRACT

In accordance with a vehicle running condition along a lane and an actual steering angle, a control unit determine a target steering angle to follow the lane, and controls an actual steering torque with an actuator to a target steering torque to achieve the target steering angle. The control unit limits the target steering torque by setting a target torque limit determined in accordance with a sensed longitudinal acceleration of the vehicle.

10 Claims, 5 Drawing Sheets

IMAGE RANGE IN NORMAL CONTROL

IMAGE RANGE IN HARD DECELERATION

LANE FOLLOWING VEHICLE CONTROL AND PROCESS

BACKGROUND OF THE INVENTION

The present invention relates to lane following vehicle control technique for controlling a vehicle along a lane of a road.

A Published Japanese Patent Application Kokai Publication No. 7(1995)-104850 discloses a driver assist system for controlling a steering torque for lane following.

SUMMARY OF THE INVENTION

This driver assist system is arranged to produce an automatic steering torque in accordance with input information on a lane, and to improve a lane following control performance by varying a control gain for multiplication of a deviation of a sensed steering angle from a required steering angle, in accordance with a vehicle speed and/or lateral acceleration.

The adjustment of the control gain based on vehicle speed and/or lateral acceleration is insufficient to prevent the course of the vehicle from deviating from an intended course in case of longitudinal load transfer due to hard acceleration/deceleration and changes in cornering force. A feedback control system based on image information obtained by a video camera functions to correct the deviation. During this correction, however, the vehicle tends to behave unsteadily.

When the lateral acceleration is estimated from the vehicle speed and steering angle, the control system is unable to steer the vehicle sufficiently along a curved road with a normal command in an accelerating state in which the cornering force is decreased from a desired level for a target steering angle, and the control system tends to cause the vehicle to turn too much in a decelerating state in which the cornering force is increased. If the control system is arranged to suspend the lane following control each time of acceleration/deceleration in such an unstable region, the value of the motor vehicle will become lower.

Moreover, squat during acceleration or dive during braking may divert the aiming direction of a camera from the desired direction, and deteriorate the accuracy of the lane detection.

It is therefore an object of the present invention to provide lane following vehicle control apparatus and/or process restraining unwanted changes in lane following control performance during acceleration or deceleration, and maintain stable running operation without providing unnatural feeling to a driver.

According to the present invention, a lane following vehicle control apparatus for a vehicle, comprises: a lane sensing section to collect information on a lane of a road ahead of the vehicle; a steering angle sensing section to sense an actual steering angle of the vehicle; a longitudinal acceleration sensing section to sense a longitudinal acceleration(or acceleration/deceleration) of the vehicle; a steering torque producing section to produce an actual steering torque in accordance with a target steering torque to follow the lane; a steering torque controlling section to set the target steering torque required for the vehicle to follow the lane, in accordance with the information on the lane and the actual steering angle; and a target steering torque limiting section to limit the target steering torque by setting a target torque limit in accordance with the longitudinal acceleration.

A lane following vehicle control process according to the present invention comprises: collecting input information on a vehicle running condition of a vehicle running along a lane, and an actual steering angle of the vehicle; obtaining a sensed actual longitudinal acceleration of the vehicle; producing a control signal to produce an actual steering torque in accordance with a target steering torque to follow the lane; setting the target steering torque to achieve a target steering angle determined in accordance with the vehicle running condition and the actual steering angle to follow the lane; and limiting the target steering torque by setting a target torque limit in accordance with the longitudinal acceleration.

A lane following vehicle control apparatus according to another aspect of the invention comprises: means for collecting input information on a vehicle running condition of a vehicle in relation to a lane; means for sensing an actual steering angle of the vehicle; means for sensing a longitudinal acceleration of the vehicle; means for producing an actual steering torque in accordance with a target steering torque to follow the lane; means for determining a target steering angle in accordance with the vehicle running condition and the actual steering angle to follow the lane; means for setting the target steering torque to achieve the target steering angle; and means for limiting the target steering torque by setting a target torque limit in accordance with the longitudinal acceleration.

The other objects and features of this invention will become understood from the following description with reference to the accompanying drawings.

DETAILED DESCRIPTION OF THE INVENTION

Figure 1A:
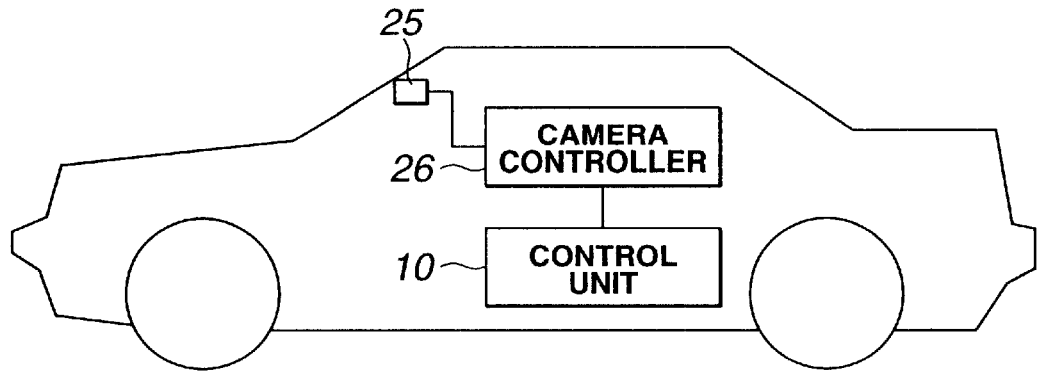
FIGS. 1A and 1B are schematic views showing a vehicle equipped with a lane following control apparatus according to a first embodiment of the present invention.
Figure 1B:
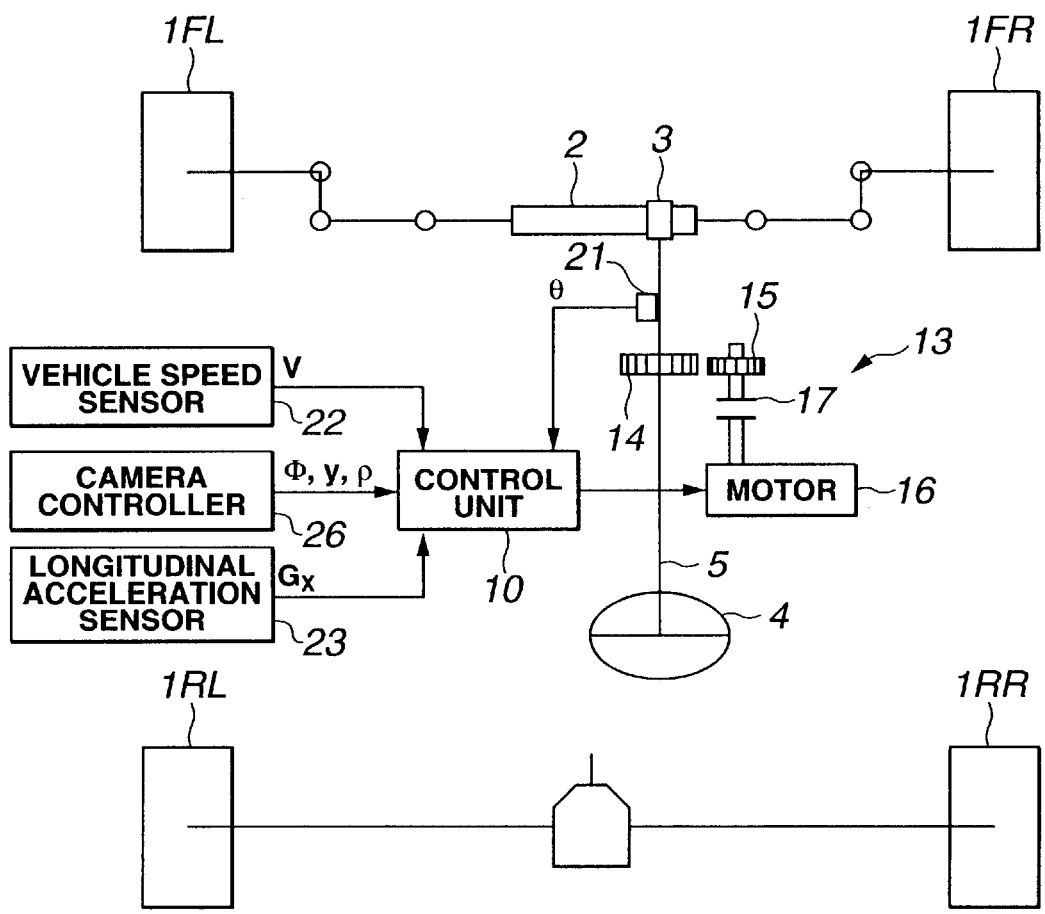

FIGS. 1A and 1B show a vehicle equipped with a lane following control apparatus or control system according to one embodiment of the present invention.

The vehicle shown in FIGS. 1A and 1B is a controlled vehicle controlled by the lane following apparatus. The vehicle has front left and right wheels 1FL and 1FR and rear left and right wheels 1RL and 1RR, and an ordinary rack and pinion type steering mechanism for steering the front wheels. The rack and pinion steering mechanism includes a rack 2 connected with tie rods of front wheels 1FL and 1FR, a pinion 3 in engagement with rack 2, and a steering shaft 5 transmitting a steering torque inputted by the driver to a steering wheel 4, to pinion 3.

A steering actuator of this example includes an automatic steering mechanism 13, provided above pinion 3 on steering shaft 5, for automatically steering front wheels 1FL and 1FR. Automatic steering mechanism 13 includes a driven gear 14 mounted coaxially with steering shaft 14, a drive gear 15 engaging with driven gear 14, and an automatic steering motor 16 for driving drive gear 15. A clutch mechanism 17 is interposed between automatic steering motor 16 and drive gear 15. Clutch mechanism 17 is engaged only in the case of an automatic steering mode, and otherwise disengaged so that the rotation of automatic steering motor 16 cannot be inputted to steering shaft 5. Automatic steering mechanism 13 serves as at least part of steering torque producing means.

Various sensors are installed in the vehicle. Steering angle sensor 21 senses an actual steering angle θ of front wheels 1FL and 1FR from a rotational angle of steering shaft 5, and supplies the sensed steering angle θ to control unit 10. A vehicle speed sensor 22 is provided on the output side of an automatic transmission of the vehicle, and arranged to sense a vehicle speed V of the vehicle and supply the sensed vehicle speed V to control unit 10. A longitudinal acceleration sensor 23 senses a longitudinal acceleration Gx of the vehicle, and supplies the sensed longitudinal acceleration Gx to control unit 10. Longitudinal acceleration sensor 23 serves as at least part of longitudinal acceleration sensing means.

A camera 25 such as a CCD camera is provided to obtain a forward image of a scene ahead of the vehicle. In this example, camera 25 is a monocular camera mounted on an inner mirror stay in the passenger compartment. Picture image data obtained by camera 25 is supplied to a camera controller 26. According to image processing method of conventional technology, camera controller 26 detects a white line or lane marker near the controlled vehicle by the technique of binary image, digitization or other image processing technique, and calculates a relative side deviation y of the controlled vehicle with respect to the road at a forward aim point ahead of the vehicle, a yaw angle Φ with respect to a tangent to the white line, and a road curvature ρ of the lane ahead of the controlled vehicle. The results of the calculation are outputted to control unit 10. A Published Japanese Patent Application Kokai Publication No. 11(1999)-102499 shows a binary image processing process which can be employed in this embodiment. Camera 25 and camera controller 26 serve as at least part of lane information collecting means.

Control unit 10 of this example is a digital system such as a computer system including at least one microcomputer as a main component. Control unit 10 calculates a desired target steering angle θ* from the input yaw angle Φ, relative side deviation γ and the road curvature ρ, to optimize a cornering operation of the vehicle. Control unit 10 further calculates a supply current or motor current $i_M$ to be supplied to automatic steering motor 16, so as to bring the sensed actual steering angle θ to the calculated target steering angle θ*. Control unit 10 performs a current limiting operation on the supply current $i_M$, and then performs a pulse duration (or width) modulating operation for conversion to a pulse current. Thus, control unit 10 controls automatic steering motor 16 in a duty control by supplying the pulse current to automatic steering motor 16.

Figure 2:
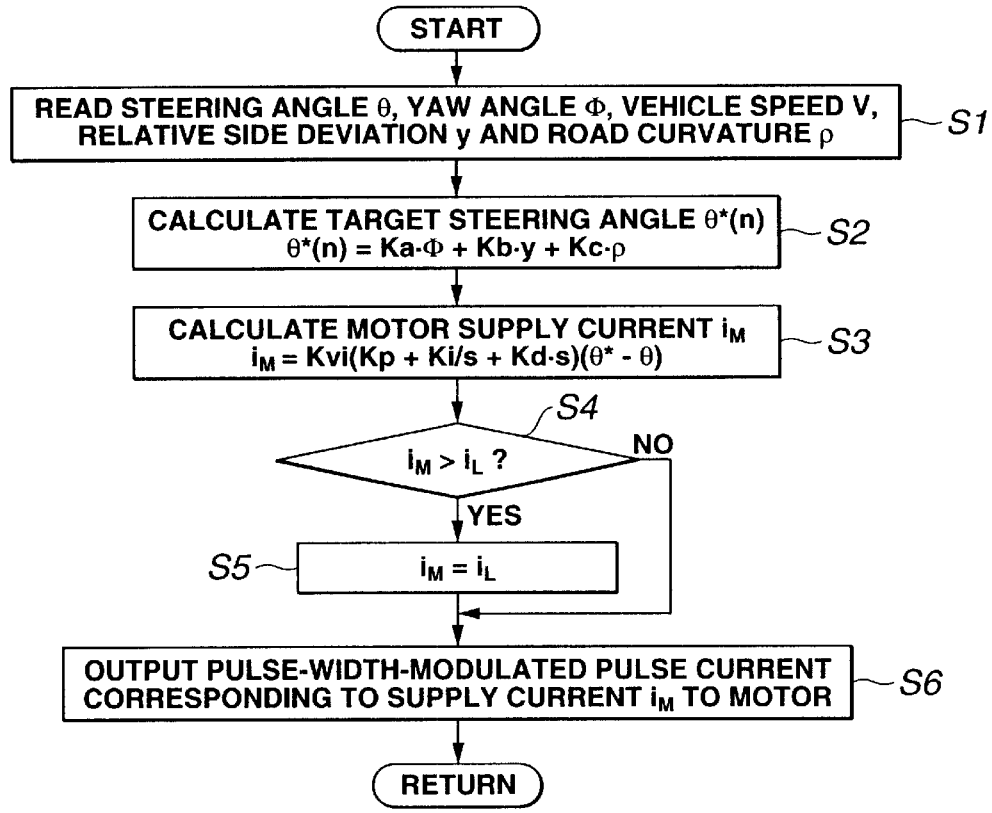
FIG. 2 is a flowchart showing a vehicle steering control procedure according to the first embodiment.
Figure 3:
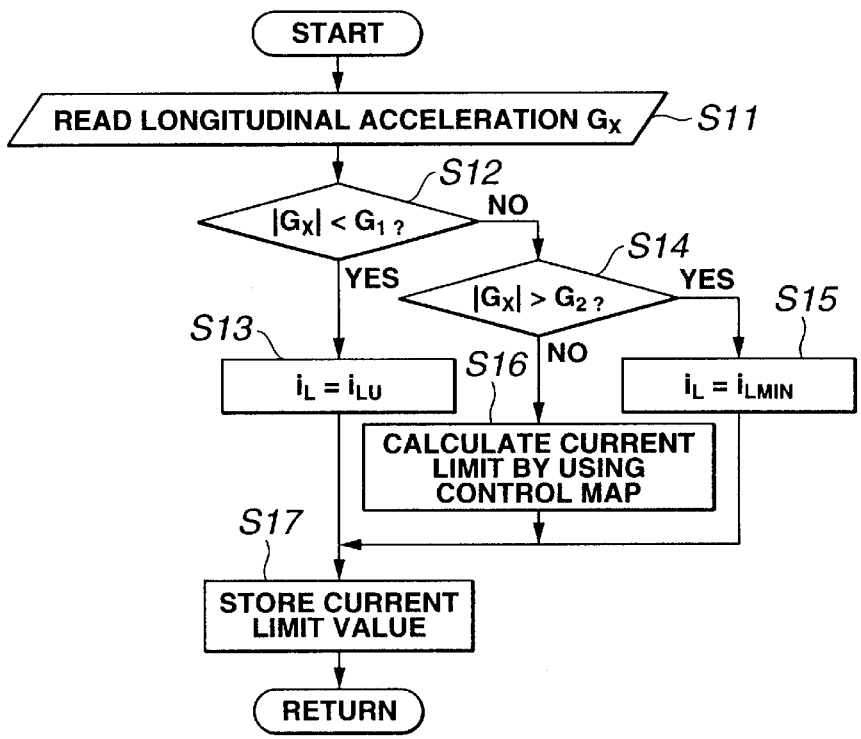
FIG. 3 is a flowchart of a current limit calculating procedure according to the first embodiment.

FIG. 2 shows a steering control procedure which the control unit 10 performs as a main program, for the automatic steering control. FIG. 3 shows a target steering torque limiting procedure which the control unit 10 performs.

At step S1 of FIG. 2, control unit 10 collects input information by reading the actual steering angle θ sensed by steering angle sensor 21, and actual vehicle speed V sensed by vehicle speed sensor 22. Control unit 10 further obtains yaw angle Φ, relative side deviation γ and road curvature β detected by camera controller 26. Then, control unit 10 proceeds to step S2.

At step S2, control unit 10 calculates target steering angle θ*. In this example, control unit 10 determines a new value of the target steering angle θ* from the yaw angle Φ, side deviation γ and curvature ρ according to the following equation.

$$\theta^* = Ka \cdot \Phi + Kb \cdot \gamma + Kc \cdot \rho \quad (1)$$

In this equation, Ka, Kb and Kc are control gains varying in dependence on vehicle speed V. In this example, the target steering angle θ* is positive in the case of right steering operation, and negative in the case of left steering operation.

At next step S3, control unit 10 calculates a motor supply current $i_M$ for the automatic steering motor 16 according to the following equation (2) to perform a PID control to reduce a deviation of the actual steering angle θ from the target steering angle θ*, and stores the calculated motor supply current $i_M$ in a predetermined motor current memory region.

$$i_M = Kvi(Kp + Ki/s + Kd \cdot s)(\theta^* - \theta) \quad (2)$$

In this equation, Kvi is a control gain for conversion from voltage to current, Kp is a proportional gain, Ki is an integral gain and Kd is a derivative gain.

Figure 4:
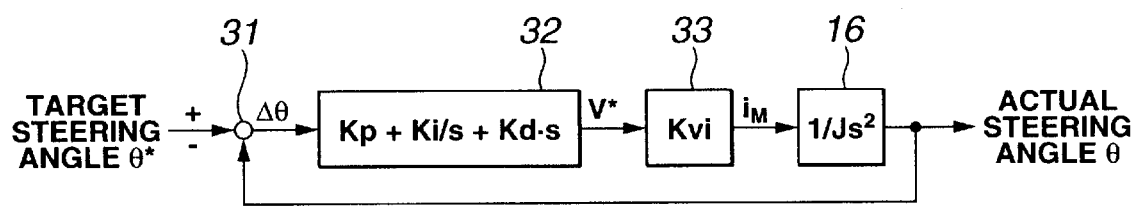
FIG. 4 is a block diagram showing a steering servo system which can be employed in the first embodiment.

This equation (2) for determining the motor supply current $i_M$ is designed to perform operations equivalent to a feedback control system shown in FIG. 4. In the feedback control system of FIG. 4, a subtracter 31 calculates a deviation Δθ by subtracting actual steering angle θ from target steering angle θ*. An operational element 32 receives deviation Δθ from subtracter 31, and calculates a target motor control voltage V* by performing a PID control computation. A voltage-to-current converter 33 receives the target motor control voltage V* from operational element 32, and calculates the motor supply current $i_M$ by multiplying the target motor control voltage V* by the control gain Kvi. The thus-calculated motor supply current $i_M$ is supplied to automatic steering motor 16. In FIG. 4, J is an inertia of a rotating portion, and Kvi is a gain of an amplifier.

At step S4 following step S3, control unit 10 determines whether the supply current $i_M$ calculated at step S3 is greater than a current limit $i_L$ stored in a current limit memory region. When $i_M \leq i_L$, control unit 10 proceeds directly from step S4 to step S6. When $i_M > i_L$, control unit 10 proceeds from step S4 to step S5, and sets supply current $i_M$ equal to current limit $i_L$ ($i_M = i_L$). The thus-determined supply current $i_M$ is stored as update in the motor current supply memory region, and then control unit 10 proceeds to step S6.

At step S6, control unit 10 delivers, to automatic steering motor 16, pulse current obtained by pulse width modulation corresponding to the motor supply current $i_M$ stored in the motor supply current memory region, in the direction corresponding to the steering direction. Thereafter, control unit 10 returns to step S1.

In the target steering torque limiting procedure of FIG. 3, control unit 10 reads actual longitudinal acceleration Gx sensed by longitudinal acceleration sensor 23, at step S11. At a next step S12, control unit 10 examines whether the absolute value |Gx| of longitudinal acceleration is smaller than a first set level G1 which is set at a limit on the acceleration side of a region capable of neglect influence on the cornering force. When |Gx|<G1, control unit 10 sets current limit $i_L$ to a normal limit value $i_{LU}$ at step S13 ($i_L=i_{LU}$), and then proceeds to step S17.

When $|Gx|\geq G1$, control unit 10 proceeds from step S12 to step S14, and further examines whether the absolute value $|Gx|$ of longitudinal acceleration is greater than a second set level G2 greater than first set level G1. When $|Gx|>G2$, control unit 10 proceeds to step S15, sets current limit $i_L$ to a minimum value $i_{LMIN}$ sufficiently smaller than normal value $i_{LU}$ ($i_L=I_{LMIN}$) at step S15, and then proceeds to step S17.

Figure 5:
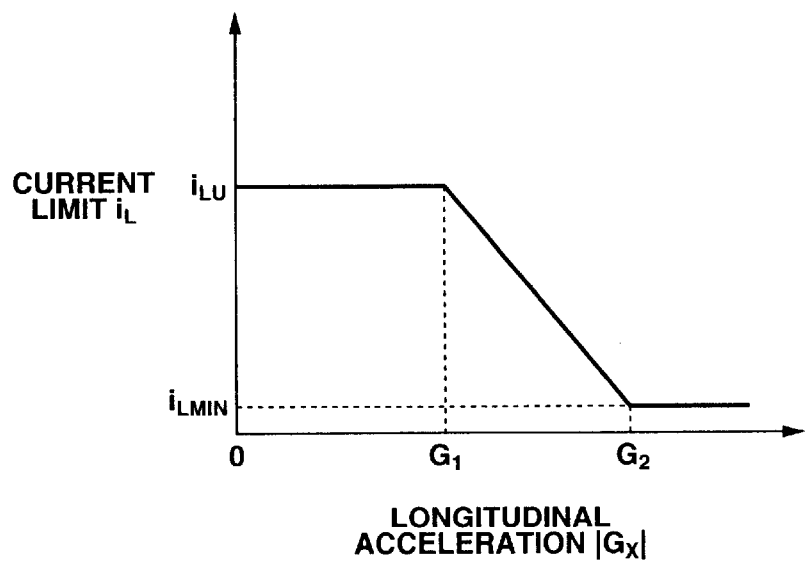
FIG. 5 is a graph showing a characteristic curve for determining a current limit ($i_L$) in the first embodiment from the absolute value of a longitudinal acceleration.

When $|Gx|\leq G2$, control unit 10 proceeds from step S14 to step S16, calculates current limit iL by lookup from a current limit calculating control map shown in FIG. 5, and then proceeds to step S17. As shown in the graph of FIG. 5 showing the absolute value of longitudinal acceleration along a horizontal axis, and the current limit iL along a vertical axis, the current limit iL is invariably equal to normal limit value iLU in a region in which the absolute value of longitudinal acceleration is smaller than or equal to first set level G1, and the current limit is decreased gradually from normal limit value iLU to minimum limit value iLMIN as the absolute value of longitudinal acceleration increases from G1 to G2. Above G2, current limit iL is held at minimum value iLMIN.

At step S17, the current limit iL determined at one of steps S13, S15 and S16 is stored as update in the current limit memory region. Then, control unit 10 terminates the current execution and returns to step S11.

In the example of FIGS. 2 and 3, step S1 serves as at least part of an input section to collect input information needed for the control, steps S2 and S3 constitute a section to control an actual steering torque by setting a target steering torque, steps S4, S5, and S12~S17 are to limit the target steering torque. Step S6 serves as at least part of an output section to produce an actual steering torque. Step S11 corresponds to a section to sense a longitudinal acceleration.

When the vehicle is in a straight line constant speed driving state along a straight road at the middle of the road, actual longitudinal acceleration Gx sensed by longitudinal acceleration sensor 23 remains approximately zero because of the vehicle speed being held constant, and hence the absolute value of actual longitudinal acceleration Gx is lower than first set level G1. Therefore, step S13 in FIG. 3 is reached from step S12, and the current limit $i_L$ is set equal to normal limit value $i_{LU}$, and stored in the current limit memory region at step S17.

In this driving state, the road curvature ρ is very small, and the relative vehicle side deviation γ and yaw angle Φ are also very small because of the vehicle running correctly at the middle of the lane along the straight road. Therefore, in the lane following control procedure of FIG. 2, the target steering angle θ* is set approximately equal to zero, actual steering angle θ remains approximately equal to zero, and the motor supply current $i_M$ calculated at step S3 becomes approximately equal to zero.

Therefore, motor supply current $i_M$ is smaller than normal current limit value $i_{LU}$, and hence motor supply current $i_M$ is supplied directed to automatic steering motor 16, as PWM pulse current, so that automatic steering motor 16 is held in a non-driven state to continue the straight ahead running operation. Thus, in the straight line running state, this control system holds the automatic steering motor 16 in the non-driven state, and enables the driver to intervene in the steering operation by turning the steering wheel with light steering effort without impediment of automatic steering torque, to change lanes or to avoid forward obstacle.

When, from this straight line driving state, the vehicle approaches a corner curved rightward with a relatively large road curvature ρ, the vehicle decelerates by a braking operation of the driver before the corner, so that longitudinal acceleration Gx becomes negative on the deceleration side. When the absolute value of longitudinal acceleration Gx is greater than first set level G1 but smaller than or equal to second set level G2, control is transferred from step S14 to step S16, and current limit $i_L$ is decreased to a value smaller than normal limit value $i_{LU}$ for constant speed operation, according to the control map of FIG. 5. Although current limit $i_L$ is decreased in this way, the motor supply current $i_M$ is not increased so much at this stage before the cornering or at the beginning of the corner, so that motor current $i_M$ is supplied to steering motor 16 as pulse current without being limited by current limit $i_L$. The vehicle is held in the automatic steering state adapted to the vehicle running condition.

If, during cornering operation at a rightward curved corner with a relatively large road curvature ρ, the absolute value of longitudinal acceleration Gx is increased to a value between first and second set levels G1 and G2 by a driver's braking operation following perception of a preceding vehicle, for example, the vehicle undergoes nose dive and load transfer toward the front wheels, so that the cornering force decreases as compared to the level of non-braking condition, and the steering characteristic shifts to understeer, necessitating an increase of steer angle to maintain an intended radius of corner.

In such a decelerating state, current limit $i_L$ is decreased from normal limit value $i_{LU}$ to a lower value in accordance with the absolute value of longitudinal acceleration Gx, in the target steering toque limiting procedure of FIG. 3. Therefore, though the vehicle deviates outward from the middle of the road, relative side deviation γ increases, and target steering angle θ* is increased at step S2, and consequently motor current $i_M$ is increased at step S3, the control system limits the motor current $i_M$ to the lowered limit value, and thereby restrains the automatic steering torque to a lower level.

Thus, by decreasing the sensitivity (or control gain) of the automatic steering control, the control system allows the vehicle to move gradually toward the outside of the turn in the lane by refraining from forcibly restoring the course toward the center of the lane, and maintain the stable running operation by preventing unwanted vehicle behavior. When the vehicle moves gradually outward, the driver steers vehicle manually toward the center of the lane and maintains the cornering operation adequate to the road curvature ρ.

If current limit iL were not decreased in accordance with the absolute value of longitudinal acceleration Gx, motor current iM would be increased to reduce the deviation of actual steering angle θ from target steering angle θ* increased by an increase of relative side deviation γ, and supplied, without limitation, to automatic steering motor 16, and the vehicle would be steered toward the center of the lane forcibly, causing unnatural feeling to the driver. By contrast, the control system according to this embodiment can prevent such unwanted vehicle behavior and maintain stable running operation.

Figure 6A:
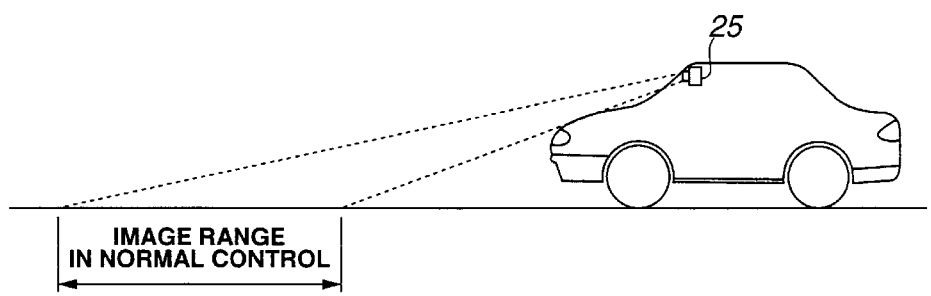
FIGS. 6A and 6B are views showing change in the vehicle body posture due to change in the longitudinal acceleration to illustrate operation of the control apparatus according to the first embodiment.
Figure 6B:
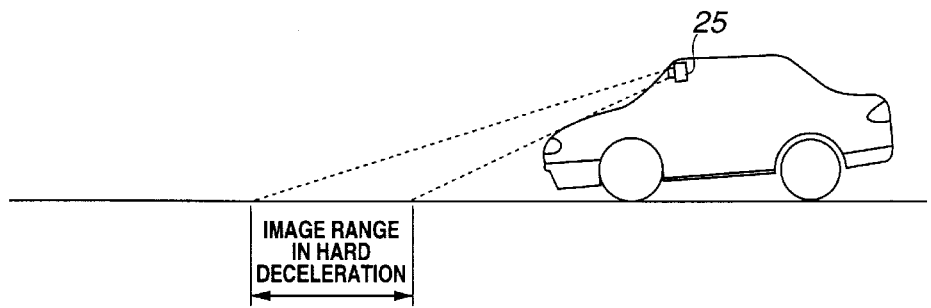

When the absolute value of longitudinal acceleration Gx exceeds second set level G2 in hard braking operation caused, for example, by perception of a parked vehicle ahead during cornering operation in a blind corner, then the control system sets current limit $i_L$ to minimum value $i_{LMIN}$ at step S15 in FIG. 3, limits the motor current $i_M$ to minimum value $i_{LMIN}$ to reduce the automatic steering control to a nearly cancelled state, and thereby to make the driver aware of necessity for steering intervention. Moreover, even if the image range of camera 25 is shifted by nose dive of the vehicle from a state shown in FIG. 6A to a state shown in FIG. 6B in which the region aimed by camera is so close as to increase the difficulty in detection of road white line, the control system according to this embodiment can decrease the sensitivity of the automatic steering control and prevent error in the control by limiting motor current $i_M$ to the minimum limit value $i_{LMIN}$.

When the vehicle is accelerated during cornering operation, the vehicle pitches rearward into squat, and the front wheel cornering force is increased from the level at constant speed driving condition, by longitudinal load transfer to the rear wheels. Therefore, the steering characteristic becomes oversteer, and the vehicle tends to shift inward of the turn from the center of the lane. In such an accelerating state, as in the decelerating state, the control system decreases current limit $i_L$ to a value lower than normal value $i_{LU}$, and thereby prevents the vehicle from being turned too much to maintain smooth behavior.

If the vehicle is accelerated hard during cornering, current limit $i_L$ is set to minimum value $i_{LMIN}$ as in hard decelerating condition, and motor current $i_M$ is limited to minimum value $i_{LMIN}$. Therefore, the control system allows the vehicle to move gradually to the outside of the turn from the center of lane without causing unwanted behavior, and encourages the driver to intervene.

Thus, the control system according to this embodiment decreases the target steering torque limit ($i_L$) gradually and thereby decreases the sensitivity of the steering control gradually when the absolute value of longitudinal acceleration Gx is increased beyond first level G1 into the region exerting influences on the cornering force. Therefore, the control system can prevent abrupt change in the sensitivity and prevent unnatural feeling to the driver.

When, due to squat (rearward pitch) during acceleration or dive (forward pitch) during braking, the aiming direction of the camera 25 is changed, and the automatic steering control tends to become inaccurate, the control system according to the embodiment decreases the control sensitivity, and maintain the stable driving operation by avoiding error.

Figure 7:
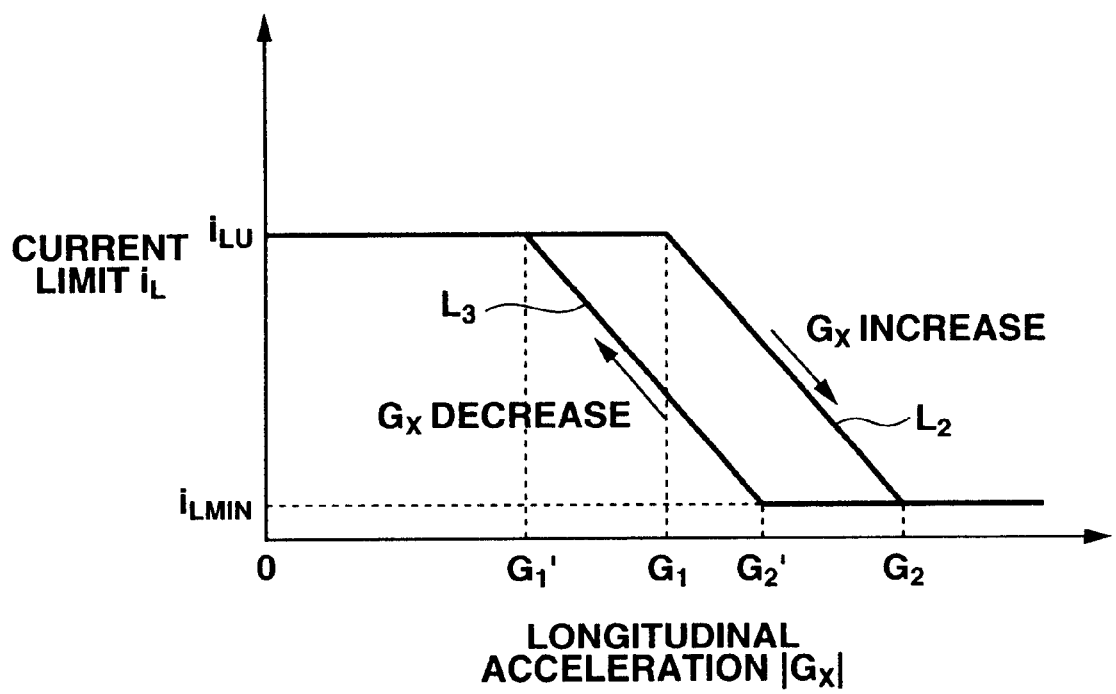
FIG. 7 is a graph showing a characteristic of the current limit with respect to the absolute value of longitudinal acceleration, used in place of FIG. 5.

FIG. 7 shows a variation of the first embodiment of the present invention. In the example of FIG. 7, current limit $i_L$ is decreased along a characteristic line L2 as in FIG. 5 when the absolute value of longitudinal acceleration Gx is increasing. When the absolute value of longitudinal acceleration Gx decreases after reaching a value greater than or equal to second set value G2, the current limit $i_L$ remains constantly at $I_{LMIN}$ until the absolute value of longitudinal acceleration Gx is decreased to a lower second value G2' smaller than the second set value G2. As the absolute value of longitudinal acceleration Gx is further decreased below lower second set value G2', the current limit $i_L$ is increased along a characteristic line L3 from $i_{LMIN}$ until normal limit value $i_{LU}$ is reached at a lower first set value G1' smaller than the first set value G1. By using the control characteristic endowed with hysteresis as shown in FIG. 7, the control system can prevent chattering of current limit $i_L$ due to increase and decrease of the absolute value of longitudinal acceleration Gx around second set level G2, and thereby improve the lane following vehicle control performance with stable current limitation.

In the illustrated embodiment, the target steering angle θ* for lane following is calculated in accordance with yaw angle Φ, relative side deviation γ and road curvature ρ. It is, however, possible to determine the target steering angle in various other ways. The target steering angle may be calculated from the relative side deviation γ and the road curvature ρ; or from vehicle speed V and road curvature ρ according to the following equation (3).

$$\theta^* = (a+b)\cdot\rho + (m\cdot\rho\cdot V^2(b\cdot Cr - a\cdot Cf))/((a+b)Cf\cdot Cr) \quad (3)$$

In this equation, a is a distance between the front wheel axle and the vehicle's center of gravity in a plan view, b is a distance between the rear wheel axle and the center of gravity in the plan view, m is the mass of the vehicle, Cf is a cornering stiffness for the left and right front wheels, and Cr is a cornering stiffness for the left and right rear wheels.

In the illustrated embodiment, motor current iM is simply limited by using current limit iL. However, the present invention is not limited to this arrangement. The control system may be arranged to determine a motor output current by multiplying a motor supply current iM by a control gain $K_G$, and to vary the control gain in accordance with the vehicle speed and the lateral acceleration sensed by a lateral acceleration or estimated from the vehicle speed and steering angle.

This application is based on a prior Japanese Patent Application No. 2000-207179. The entire contents of this Japanese Patent Application No. 2000-207179 with a filing date of Jul. 7, 2000 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A lane following vehicle control apparatus for a vehicle, comprising:
    a lane sensing section to collect information on a lane of a road ahead of the vehicle;
    a steering angle sensing section to sense an actual steering angle of the vehicle;
    a longitudinal acceleration sensing section to sense a longitudinal acceleration of the vehicle;
    a steering torque producing section to produce an actual steering torque in accordance with a target steering torque to follow the lane;
    a steering torque controlling section to set the target steering torque required for the vehicle to follow the lane, in accordance with the information on the lane and the actual steering angle; and
    a target steering torque limiting section to limit the target steering torque by setting a target torque limit in accordance with the longitudinal acceleration,
    wherein the target steering torque limiting section decreases the target torque limit when the longitudinal acceleration is higher than or equal to a first level.

2. The lane following vehicle control apparatus as claimed in claim 1, wherein the target steering torque limiting section decreases the target torque limit with increase in the longitudinal acceleration when the longitudinal acceleration is higher than or equal to the first level.

3. The lane following vehicle control apparatus as claimed in claim 2, wherein the target steering torque limiting section sets the target torque limit at a minimum limit value when the longitudinal acceleration is higher than or equal to a second level higher than the first level, and decreases the target torque limit from a normal limit value to the minimum value as the longitudinal acceleration increases from the first level to the second level.

4. The lane following vehicle control apparatus as claimed in claim 3, wherein the target steering torque limiting section sets the first level and the second level, respectively, equal to a higher first value and a higher second value when the longitudinal acceleration is increased, and sets the first level and the second level, respectively, equal to a lower first value lower than the higher first value and a lower second value lower than the higher second value when the longitudinal acceleration is decreased.

5. The lane following vehicle control apparatus as claimed in claim 1, wherein the target steering torque limiting section holds the target torque limit at a normal limit value when the absolute value of the longitudinal acceleration is lower than the first level and decreases the target torque limit with an increase in the absolute value of the longitudinal acceleration when the absolute value of the longitudinal acceleration is higher than or equal to the first level.

6. The lane following vehicle control apparatus as claimed in claim 5, wherein the target steering torque limiting section holds the target torque limit at a minimum limit value when the absolute value of the longitudinal acceleration is higher than or equal to a second level higher than the first level, and decreases the target torque limit from the normal limit value to the minimum limit value as the absolute value of the longitudinal acceleration increases from the first level to the second level.

7. The lane following vehicle control apparatus as claimed in claim 1, wherein the steering torque producing section comprises an electric motor to produce the actual steering torque in response to a supply current, and the target steering toque limiting section limits the supply current for the electric motor by setting the target torque limit as an upper limit of the supply current.

8. A lane following vehicle control process comprising:

collecting input information on a vehicle running condition of a vehicle running along a lane, and an actual steering angle of the vehicle;

obtaining a sensed actual longitudinal acceleration of the vehicle;

producing a control signal to produce an actual steering torque in accordance with a target steering torque to follow the lane;

setting the target steering torque to achieve a target steering angle determined in accordance with the vehicle running condition and the actual steering angle to follow the lane; and limiting the target steering torque by setting a target torque limit in accordance with the longitudinal acceleration, the target torque limit being decreased when the longitudinal acceleration is higher than or equal to a first level.

9. A lane following vehicle control apparatus comprising:

means for collecting input information on a vehicle running condition of a vehicle in relation to a lane;

means for sensing an actual steering angle of the vehicle;

means for sensing a longitudinal acceleration of the vehicle;

means for producing an actual steering torque in accordance with a target steering torque to follow the lane;

means for determining a target steering angle in accordance with the vehicle running condition and the actual steering angle to follow the lane;

means for setting the target steering torque to achieve the target steering angle; and means for limiting the target steering torque by setting a target torque limit in accordance with the longitudinal acceleration, wherein the target steering torque limiting means decreases the target torque limit in accordance with the absolute value of longitudinal acceleration, and wherein the target steering torque limiting means decreases the target torque limit from a normal limit value to a minimum limit value when the absolute value of the longitudinal acceleration increases from a first level to a second level.

10. The lane following vehicle control apparatus as claimed in claim 9, wherein the target steering torque limiting section sets the target torque limit invariably equal to the normal limit value when the absolute value of the longitudinal acceleration is equal to or lower than the first level, and sets the target torque limit invariably equal to the minimum limit value when the absolute value of the longitudinal acceleration is equal to or higher than the second level.

* * * * *